US00RE38819E

(19) United States
(12) Reissued Patent
Kuroki et al.

(10) Patent Number: US RE38,819 E
(45) Date of Reissued Patent: Oct. 11, 2005

(54) SURFACE DISCHARGE TYPE PLASMA DISPLAY PANEL DIVIDED INTO A PLURALITY OF SUB-SCREENS

(75) Inventors: Seiki Kuroki, Kawasaki (JP); Nguyen Thanh Nhan, Kawasaki (JP)

(73) Assignee: Fujitsu Limited, Kawasaki (JP)

(21) Appl. No.: 09/951,749

(22) Filed: Sep. 14, 2001

Related U.S. Patent Documents

Reissue of:
(64) Patent No.: 5,952,783
Issued: Sep. 14, 1999
Appl. No.: 08/823,487
Filed: Mar. 25, 1997

(30) Foreign Application Priority Data

Apr. 3, 1996 (JP) ..... 8-81421

(51) Int. Cl.[7] ..... H01J 17/00
(52) U.S. Cl. ..... 313/590; 313/582; 313/584
(58) Field of Search ..... 313/582, 583, 313/584, 585, 586, 590

(56) References Cited

U.S. PATENT DOCUMENTS

| | | | | |
|---|---|---|---|---|
| 4,233,623 A | * | 11/1980 | Pavliscak | 358/59 |
| 4,320,418 A | | 3/1982 | Pavliscak | |
| 4,426,646 A | * | 1/1984 | Yamaguchi et al. | 345/60 |
| 5,187,578 A | * | 2/1993 | Kohgami et al. | 358/168 |
| 5,914,563 A | | 6/1999 | Lee et al. | |

FOREIGN PATENT DOCUMENTS

EP 0 444 962 * 9/1991

OTHER PUBLICATIONS

Patent Abstracts of Japan of JP 11–065486 published Mar. 5, 1999.

Patent Abstracts of Japan of JP 2000–231881 published Aug. 22, 2000.

Yamamoto et al., "14.2: A 40–in.–Diagonal HDTV Plasma Display,"*Sid 93 Digest*, May 16, 1993, pp. 165–168.*

Yamamoto et al., "Liquid Crystal Display Device," *Patent Abstracts of Japan* (76 P 721), 63–018331 dated Jan. 26, 1988.*

Usuda et al., "Gas Discharge Panel," *Patent Abstracts of Japan* (109 E 744), 63–314744 dated Dec. 22, 1988.*

Tsuji, "Plasma Display Device," *Patent Abstracts of Japan* (121 P 1344), 4–018594 dated Jan. 22, 1992.*

* cited by examiner

*Primary Examiner*—Vip Patel
(74) *Attorney, Agent, or Firm*—Staas & Halsey LLP

(57) ABSTRACT

A surface-discharge type PDP includes plural electrode pairs formed of first and second sustain electrodes arranged on a first substrate. Each pair extends along a line direction, and the first and second sustain electrodes are in parallel and adjacent to each other. Plural address electrodes arranged on a second substrate opposing the first substrate via a discharge space, each extending along a row direction, a matrix corresponding to a screen to be displayed is formed with the main electrodes and address electrodes, the address electrodes are orthogonal to the main electrodes, each of the address electrode is divided into, for example two partial address electrodes separated from each other by a border line located between adjacent main electrode pairs, whereby the screen is divided into two partial screens, wherein a first clearance between the partial address electrodes is substantially larger than a second clearance between main electrode pair adjacent across the border line. The arrangement order of the first and second sustain electrodes may preferably be such that first sustain electrodes of the first and second partial screens face each other via the border line, and the partial address electrodes may not cross over the first sustain electrodes nearest to the border line.

12 Claims, 7 Drawing Sheets

PRIOR ART

SURFACE DISCHARGE TYPE PLASMA DISPLAY PANEL DIVIDED INTO A PLURALITY OF SUB-SCREENS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an AC type plasma display panel, referred to hereinafter as a PDP, of matrix formation, particularly to a PDP having a screen which is divided into a plurality of sub-screens.

2. Description of the Related Arts

Figure 1:
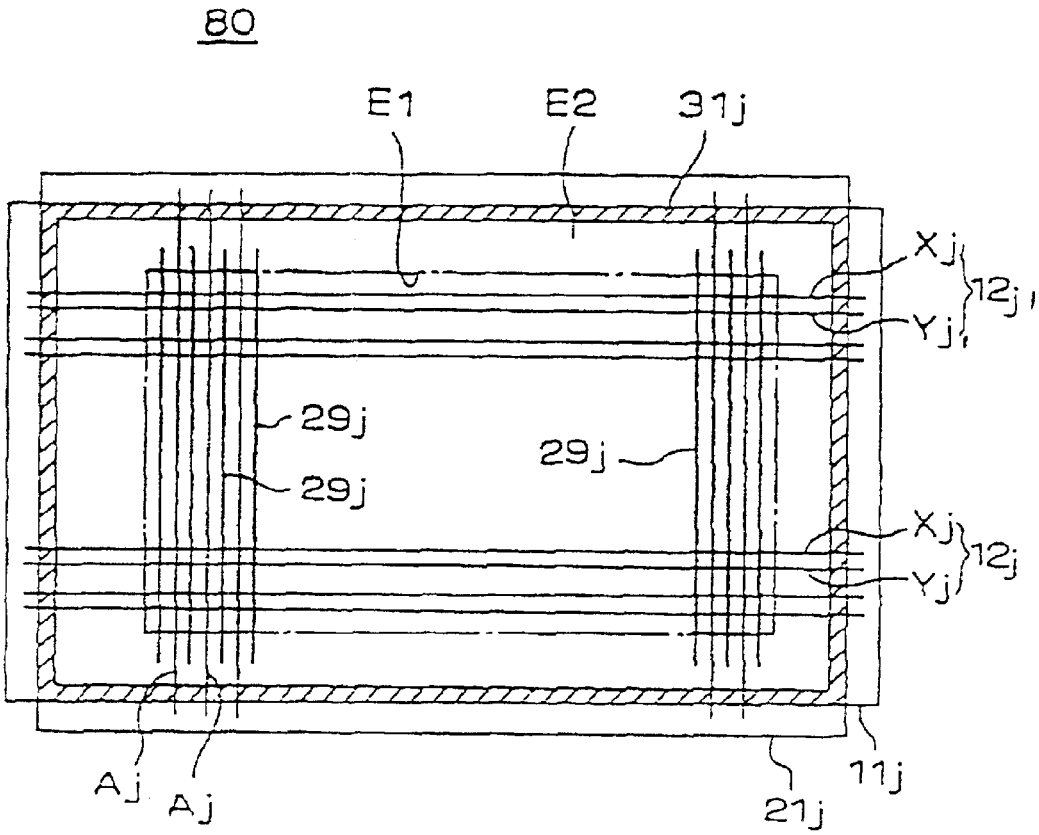
PRIOR ART Fig. 1
Figure 2:
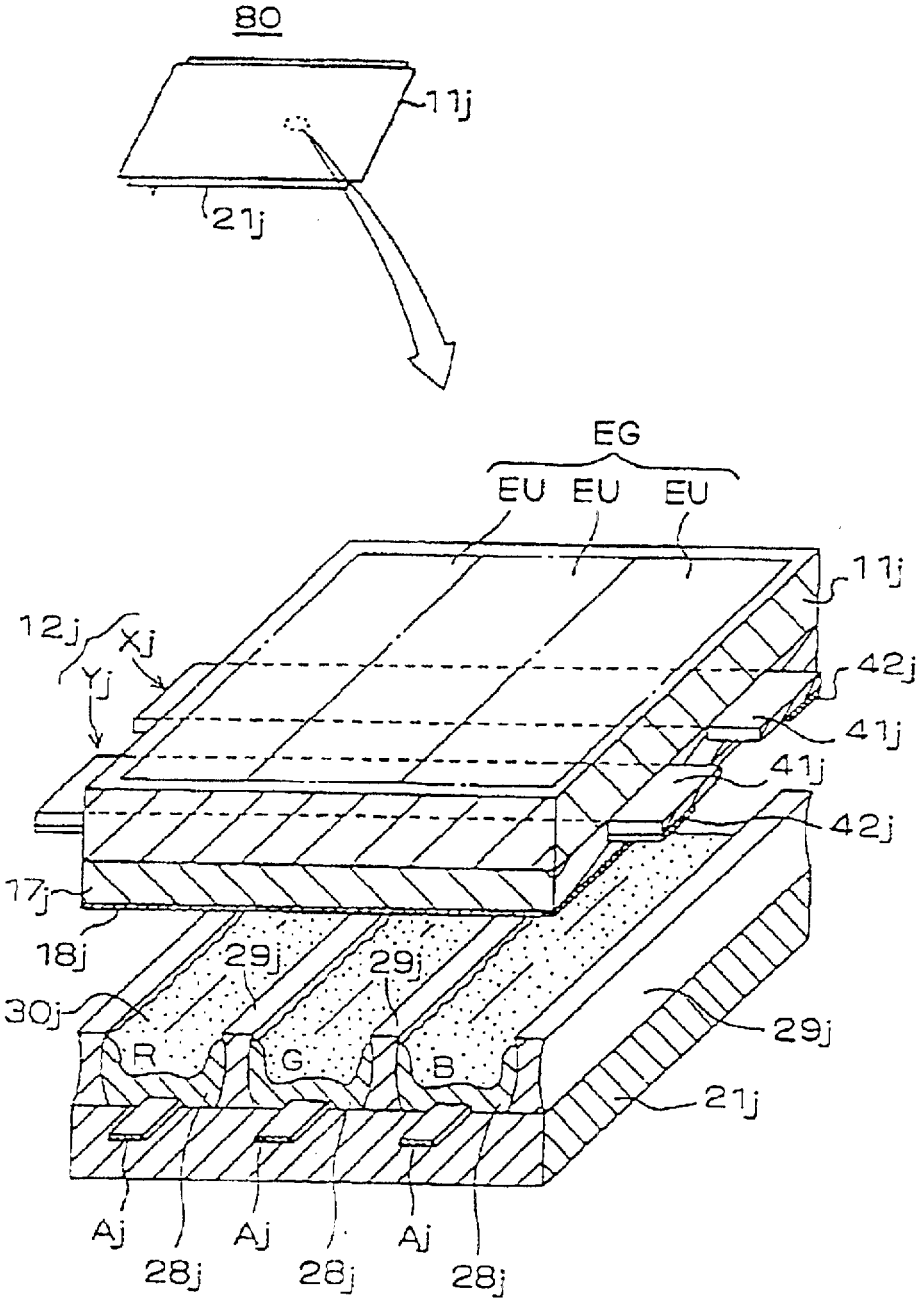
PRIOR ART Fig. 2

A prior art surface discharge type PDP is hereinafter described with reference to FIG. 1 schematically illustrating a plan view of the electrode configuration, and FIG. 2 schematically illustrating a decomposition perspective view of the internal structure.

Prior art PDP 80 includes a plurality of electrode pairs 12j of first and second sustain electrodes Xj & Yj in parallel with each other and extending straight, both of which may be called main electrodes, and a plurality of address electrodes Aj in straight and orthogonal to first and second sustain electrodes Xj & Yj. Each electrode pair 12j corresponds to a single line of the matrix formation, and each address electrode Aj corresponds to a single row. That is, an area E1 where the sustain electrodes and the address electrodes intersect each other is a displaying area, referred to hereinafter as a screen. In the periphery of the screen is provided a non-lighting area E2 of a predetermined width in order to be free from an effect of a gas degased from sealant to seal the two glass substrates 11j and 21j.

As shown in FIG. 2, a prior art PDP 80 is constituted with a front glass substrate 11j, first and second sustain electrodes Xj & Yj, a dielectric layer 17j for an AC drive, a protection layer 18j, a back glass substrate 21j, address electrodes Aj, separator walls 29j and fluorescent material layers 28j for a full-color display. A discharge space 30j therein is divided into each subpixel EU along a line direction, that is, a direction along which sustain electrodes Xj & Yj extend, by separator wall 29j, which also determines a gap between the substrates.

First and second sustain electrodes Xj & Yj are arranged on an inner surface of back glass substrate 21j, and each of which is formed of a wide transparent electrically conductive film 41j and a metal film 42j thereon for securing a good electrical conductivity. Transparent electrically conductive film 41j is patterned belt-like wider than metal film 42j so that a surface discharge may expand.

Fluorescent material layer 28j is coated between each separator wall 29j on back glass substrate 21j in order to reduce an ion bombardment, and emits a light by a local excitation of ultraviolet rays generated in the surface discharge. Among the visible radiations emitted from the surface of fluorescent layer 28j, i.e. the surface to face the discharge space, the light which can penetrate through glass substrate 11j becomes a display light.

Pixel, i.e. picture element, EG of the screen matrix includes three sub-pixels EU which line up along the line direction, where the lighting colors of the three sub-pixels EU are mutually different as denoted with R, G and B, so that each color to be displayed of a single pixel is determined by the combination of the basic R, G and B. The pattern arrangement of separator walls 29j is so-called a stripe pattern, where the part which corresponds to each row in discharge space 30 extends in the row direction continuously to cross over all the lines. The emitting color of sub-pixels EU in each row is identical.

Second sustain electrode Yj of the electrode pair 12j and address electrode Aj are used for selecting, i.e. addressing, a pixel EU to light or not to light. That is, a screen scanning is performed sequentially line by line by applying a scan pulse onto sequential one of n second sustain electrodes Yj, where n indicates the quantity of the lines, and a predetermined electrically charged state is formed in the selected cell of each row by an opposing discharge, i.e. an address discharge, generated between the second sustain electrode Yj and an address electrode Aj selected in accordance with the contents to be displayed. After the addressing operation is thus performed, upon an application of the sustain pulses of a predetermined peak value alternately onto first and second sustain electrodes Xj & Yj a surface discharge, i.e. a sustain discharge, takes place in the cell in which wall charges of a predetermined amount remaining at the end of the addressing operation.

In performing the addressing operation according to the above-described line-scanning, if the quantity of the lines are increased so as to meet a requirement to enhance the screen size or to accomplish a higher resolution, the period required for the addressing operation becomes longer. However, a single frame, that is a period for displaying a single picture, is unalterable. Accordingly, the longer the addressing period becomes, the shorter the time length allocatable to the sustain period becomes, resulting in inadequate brightness of the display. Moreover, the gradation display by dividing the frame become difficult.

Therefore, it has been measured to divide screen E1 along the row direction, that is, along upper and lower direction of FIG. 1 into plural partial screens in each of which the addressing operation is concurrently performed. Then, address electrodes Aj are divided into each partial screen too. Dividing of the display screen into two partial screens allows the period required for the addressing operation to reduce to a half.

However, in dividing all the sustain electrode pairs simply into two partial screens, there is a problem in that an erroneous discharge may take place across the border line where the second sustain electrode Y of the first sub-screen E11 faces the first sustain electrodes of the next line of the next partial screen E12.

This problem is hereinafter described in detail with reference to FIGS. 3A and 3B. FIG. 3B schematically illustrates a cross-sectional view of the electrode structure cut along b—b of FIG. 3A. Display screen E1 is divided into two partial screens E11 and E12. In each of partial screens E11 and E12 are provided partial address electrodes A1j and A2j, respectively, symmetric with respect to the border line DL. However, in practically sealing the two glass substrates the symmetry may be somewhat deviated. Clearance Dj between two partial address electrodes A1j and A2j respectively of first and second partial screens E11 and E12 is chosen narrower than the electrode clearance d between two lines. This is in order to keep properly the positional relation between second sustain electrode Y and partial address electrode A, even in the case where the symmetry is deteriorated due to a miss-alignment of the facing two glass substrates during the sealing operation, that is, the end of first partial address electrode A1 can always cross over the last second sustain electrode Yn, so that an address discharge can certainly take place between first partial address electrode A1 and the last second sustain electrode Yn of the first partial screen.

However, in the case where addressing operation is performed concurrently for two partial screens E11 and E12, when addressing discharge is generated only in one of the partial screens there is generated a potential different between two partial address electrodes A1jn and A2jn. Accordingly, the narrower the clearance Dj is, the more likely an erroneous discharge, or an interference, generates between two partial address electrodes A1j and A2j or between a second sustain electrode Yjn and a second partial address electrode A2jn+1 of second partial screen.

SUMMARY OF THE INVENTION

It is a general object of the invention to prevent an erroneous discharge, i.e. an interference, across a border line of the divided screens in attempting a high speed addressing operation by dividing a screen.

A surface-discharge type plasma display panel includes: a plurality of main electrode pairs formed of first and second sustain electrodes arranged upon a first substrate, each extending along a line direction, the first and second sustain electrodes are in parallel and adjacent to each other. The display panel further includes a plurality of address electrodes arranged upon a second substrate opposing the first substrate via a discharge space, each extending along a row direction, a matrix corresponding to a screen to be displayed is formed with the main electrodes and address electrodes, the address electrodes are orthogonal to the main electrodes, each of the address electrode is divided into, for example two partial address electrodes separated from each other by a border line located between adjacent main electrode pairs, whereby the screen is divided into two partial screens, wherein a first clearance between the partial address electrodes is substantially larger than a second clearance between main electrode pair adjacent across the border line. The arrangement order of the first and second sustain electrodes may preferably be such that first sustain electrodes of the first and second partial screens face each other via the border line, and the partial address electrodes may not cross over the first sustain electrodes nearest may not cross over the first sustain electrodes nearest to the border line.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

Figure 3A:
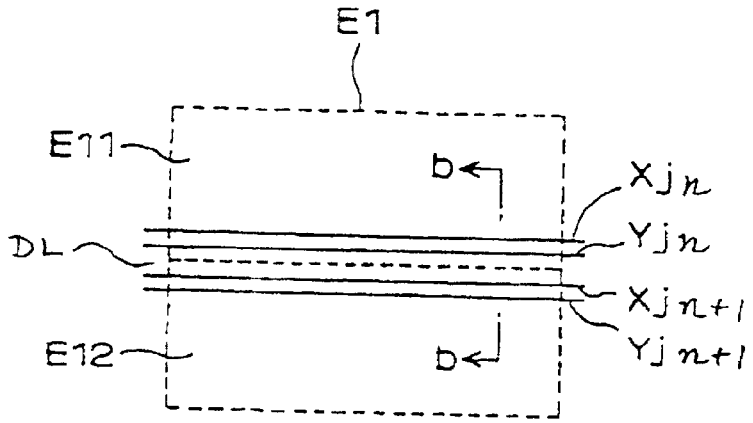
Figure 3B:
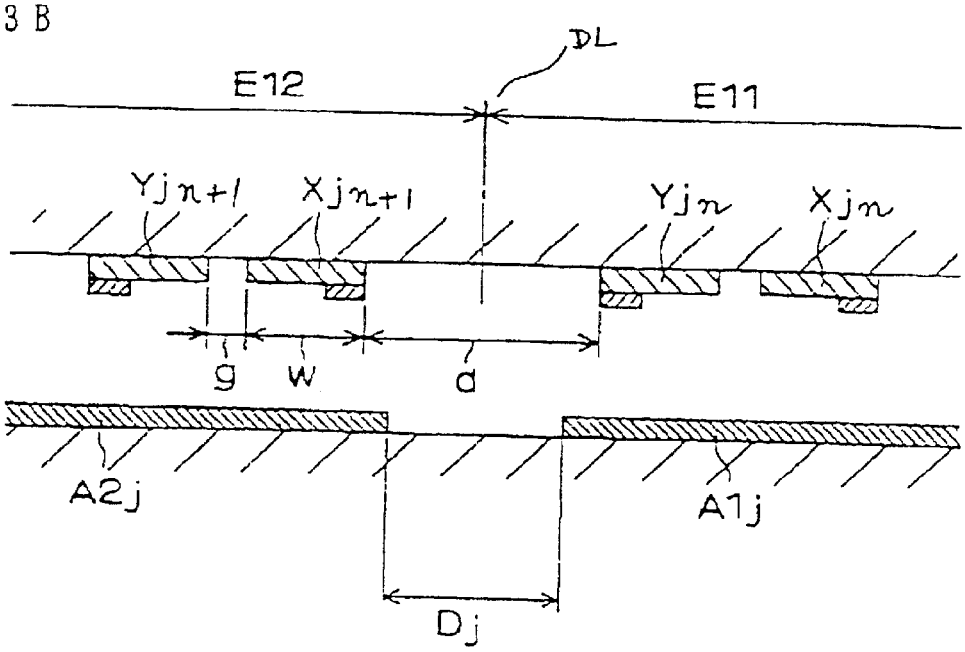
Figure 4:
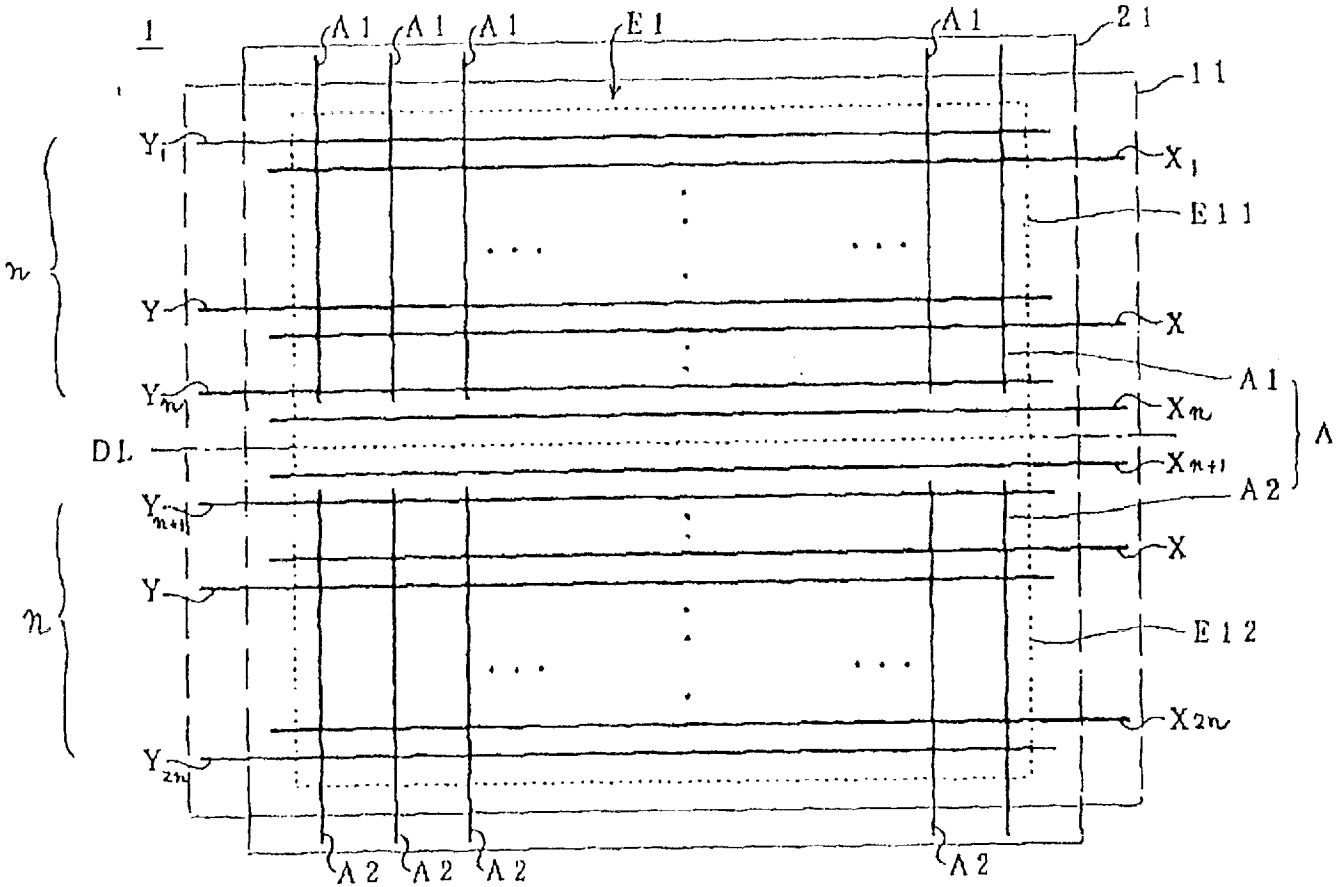
Figure 5:
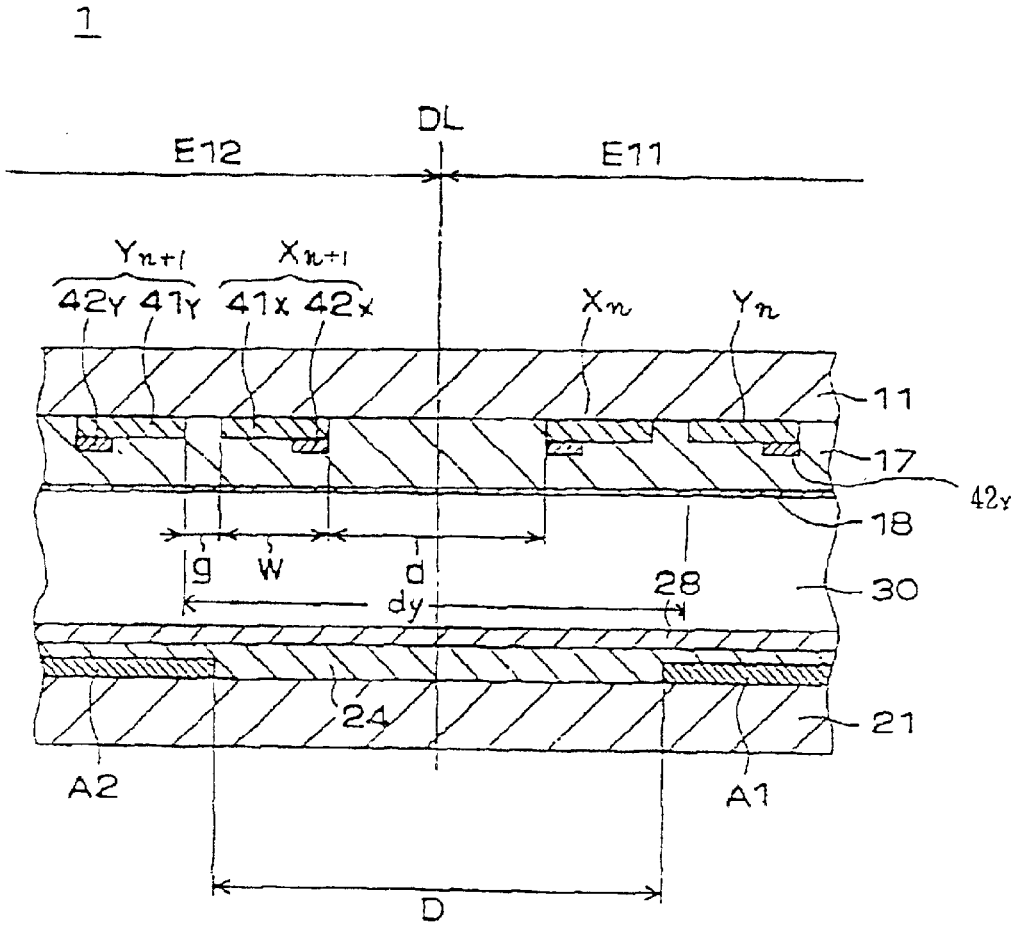
Figure 6:
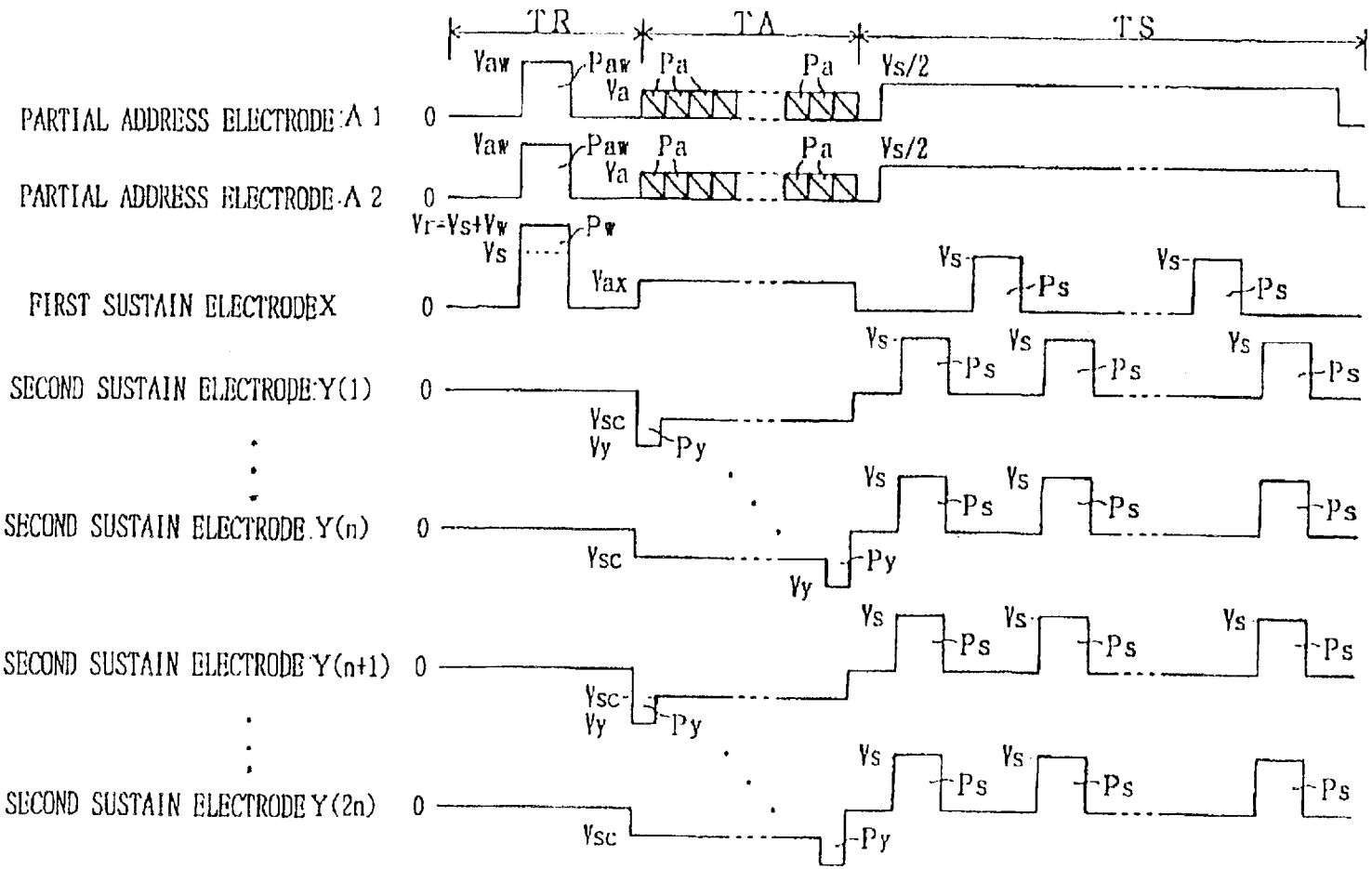
Figure 7:
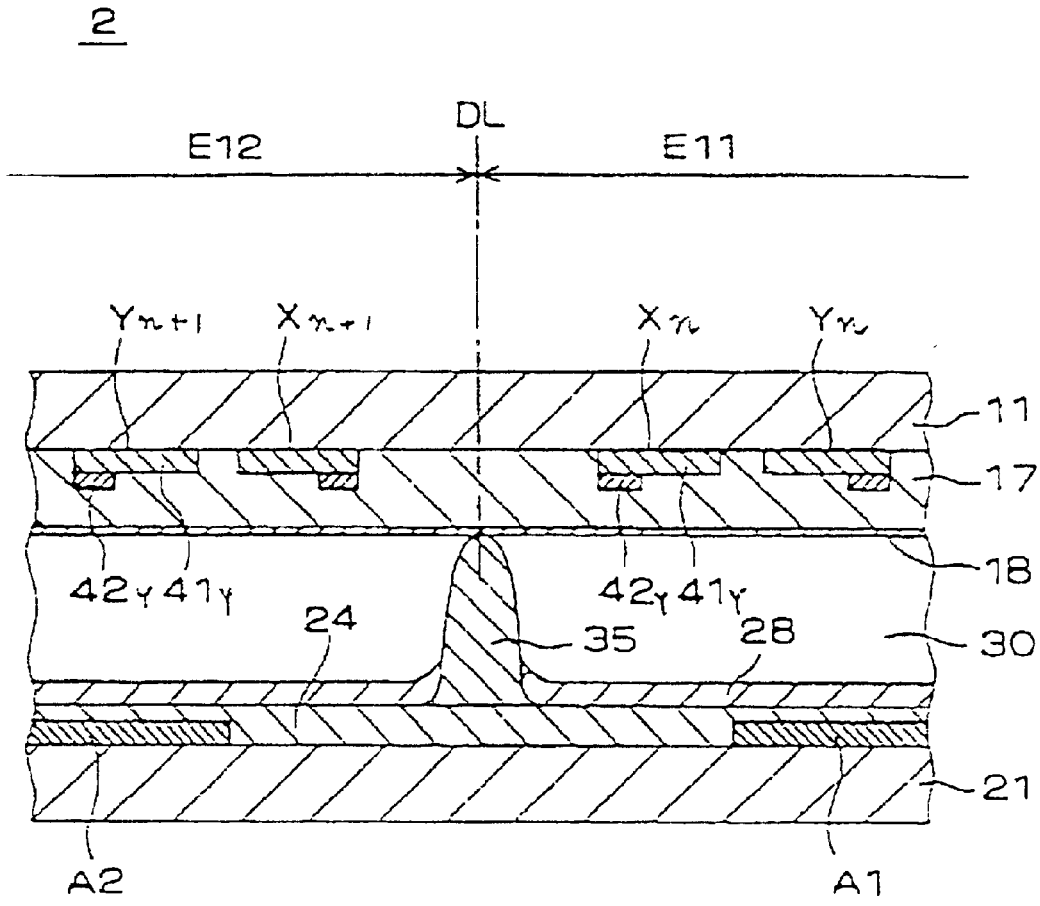

FIG. 1 schematically illustrates an electrode configuration of a prior art PDP;

FIG. 2 schematically illustrates a decomposition perspective view of the prior art PDP;

FIGS. 3A and 3B schematically illustrate an electrode configuration and a cross-sectional view of the electrode structure of the prior art PDP having two partial screens;

FIG. 4 schematically illustrates an electrode configuration of the electrode structure of a first preferred embodiment of the present invention, having two partial screens;

FIG. 5 schematically illustrates a cross-sectional view of the electrode structure of the first preferred embodiment of the present invention;

FIG. 6 schematically illustrates a timing chart of voltages applied to the PDP of the present invention; and FIG. 7 schematically illustrates a cross-sectional view of the electrode structure of the second preferred embodiment of the present invention.

DESCRIPTION OF THE PREFERRED EMBODIMENT

A preferred embodiment of the present invention is hereinafter described with reference to FIG. 4 schematically illustrating electrode configuration of a PDP, and FIG. 5 schematically illustrates a cross-sectional cut view of a PDP of the present invention.

PDP 4 is a surface discharge type PDP in which a single line is formed of a pair of first and second sustain electrodes X and Y, each in parallel and straight. The screen E1 is divided into two partial screens, that is first partial screen E11 and a second partial screen E12, in the row direction. The quantity of lines of the entire screen E1 is 2n, where the quantity of lines of each partial screen E11 and E12 is n. On each row of first partial screen E11 is provided with a first partial address electrode A1, and on each row of second partial screen E12 is provided with a second partial address electrode A1. A single pair of first and second address electrodes A1 and A2 aligned along a single row forms a single address electrode A which corresponds to the single row. First address electrodes A1 are led out to a first side at first ends of the address electrodes, and second address electrodes A2 are led out to a second side, opposite from the first side, at second ends of the address electrodes. First sustain electrodes X are led out to a first side of first glass substrate 11 at first ends of the lines, and second sustain electrodes Y are led out to a second side opposite from the first side.

Totally 2n first sustain electrodes X and totally 2n second sustain electrodes Y are arranged along the row direction symmetrically with respect to the border line DL of first partial screen E11 and second partial screen E12 so that Xn-th and Xn+1 the first sustain electrodes Xn and Xn+1 are facing each other across the border line DL. In other words, in the first partial screen E11 are alternately arranged second and first sustain electrodes Y and X from the top of the first partial screen to the border line in the order of Y1, X1 . . . Xn−1, Yn−1, Xn; while in the second partial screen E12 are alternately arranged first and second sustain electrodes X and Y from the border line DL to the bottom of the second partial screen in the order of Xn+1, Yn+1 . . . X2n and Y2n, where the order is opposite to that in the first partial screen E1. Each of first address electrodes A1 in first partial screen E11 crosses over all of n second sustain electrodes Y1–Yn and all of (n−1), first sustain electrodes X1–Xn−1 excluding the last one Xn adjacent to the border line DL. In the similar way, each of second address electrodes A2 in second partial screen E12 cross over all of n second sustain electrodes Yn+1–Y2n and all of (n−1) first sustain electrodes Xn+2–X2n excluding the first one Xn+1 adjacent to the border line DL.

First and second sustain electrodes X and Y are arranged on an inner surface of front glass substrate 11, and respectively formed of a transparent electrically conductive film 41 and a metal film 42 thereon as shown in FIG. 5. Upon a dielectric layer 17 covering first and second sustain electrodes X and Y is vapor-deposited a protection layer 18 formed of MgO, magnesium oxide. First and second partial address electrodes A1 and A2 are arranged on an inner surface of back glass substrate 21 and is coated with an insulating layer 24. Upon insulating layer 24 are provided separator walls, which is not shown in the figure, and a fluorescent material layer 28. Each separator wall separates discharge space 30 into each subpixel along the line direction, and also acts to keep the height of the discharge space 30 uniform. The separator wall structure and the layout pattern of the fluorescent material layer of PDP 1 are identical to those of the prior art structure shown in FIG. 3.

In performing the display, the addressing operation is first carried out by generating a discharge in a direction along the thickness of the glass substrates, referred to hereinafter as an opposing discharge, between second sustain electrode Y and first partial address electrode A1 in first partial screen E11, and between second sustain electrode Y2 and second partial address electrode A in second partial screen E12.

A clearance D between first partial address electrode A1 of first partial screen E11 and second partial address electrode A2 of second partial screen E12 is chosen longer than the sum of twice of the width w of first sustain electrode X and a clearance d, typically 430 $\mu$m, between two first sustain electrodes Xn & Xn+1 across the border line DL, and shorter than a clearance dy between two nearest second sustain electrodes Yn & Yn+1 across the border line DL, that is $2w+d<D<2w+d+2g=dy$, where g indicates a clearance between the paired first and second sustain electrodes X and Y. These dimensional conditions are such that clearance D between address electrodes A1 & A2, respectively of the first and second partial screens, allow the address electrodes to cover second sustain electrodes Yn and Yn+1 to which the address discharge has to certainly performed, however, not to cross over the first sustain electrodes Xn and Xn+1 to which no discharge be generated from the address electrodes A. Thus, the clearance D between address electrodes A1 & A2 is adequately wide to keep address electrode An & An+1 away from the second sustain electrode Yn+1 & Yn of the opposite partial screen. Therefore, in PDP of the present invention more hardly takes place the erroneous discharge occurs less frequently than in the prior art PDP, that is, there is no interference between two partial screens.

A typical driving method of PDP 1 is hereinafter described. FIG. 6 schematically illustrates waveforms of the applied voltages. A single field corresponds to a single frame. However, in reproducing a screen, i.e. a scene, scanned by an interface format, such as of a television, two fields are used in displaying a single screen.

In order to achieve a gradation display, a single field is divided into a plurality, for example six to eight, a sub-fields. Each sub-field contains a reset period TR, an address period TA and a sustain period TS. Quantity of lightings in the sustain period TS is predetermined so as to appropriately weight the brightness. Accordingly, each sub-field corresponds to a display period of a certain gradation level.

Reset period TR is such that in order to be free from an influence of the previous lighting state the wall charges in the first and second partial screen E11 and E12 are all erased; i.e. an entire erasing is performed. A writing pulse PW is applied to all of first sustain electrodes X, and concurrently a pulse Paw having the same polarity as the first sustain electrodes X is applied to all of first and second partial address electrodes A1 & A2. In response to the rise of the writing pulse strong surface discharges take place at all the lines so as to once accumulate the wall charges on dielectric layer 17. However, in response to the fall of the writing pulse a so-called self-discharge by the wall discharges takes place whereby the wall charges on the dielectric layer 17 disappear. The pulse Paw is in order to suppress a discharge between the address electrodes A and the first sustain electrodes X, accordingly, to suppress an accumulation of wall charges on the back glass substrate.

Address period TA is a period during which a line-sequential addressing operation is performed. First sustain electrodes X are applied with a potential Vax positive with respect to the earth potential, for example 50 V. All the second sustain electrodes Y are applied with a negative potential Vsc with respect to the earth potential, for instance −70V.

Under such a condition, each line in each partial screen E11 & E12 is sequentially selected one by one, for example, beginning from each top line by applying thereto a scanning pulse Py of the negative polarity, for instance, −170V.

Concurrent to the selection of the line, an address pulse Pa of positive polarity having a peak value Va, for instance, 60V, is applied to specific first & second partial address electrode A1 & A2, associated with a display cell to be lit, respectively. At the display cell on the selected line, and to which address pulse Pa is applied, an address discharge takes place between second sustain electrode Y and first and second partial address electrodes A1 or A2. No discharge takes place between first sustain electrode X and first or second partial address electrodes A1 or A2 because thus selected first sustain electrode X is applied with a potential Vax having the polarity of the address pulse Pa so as to keep the potential difference between the first sustain electrode X and address electrode A lower than the discharge firing voltage therebetween.

In consideration of avoiding an interference of the discharges between the lines it is preferable to deviate the timing to select the top line, the n+1 th line, of the second screen E12 from the moment to select the last line, the n-th line, of the first screen E11.

Sustain period TS is a period during which the quantity of times for a cell to light set in the addressing period is reproduced so as to achieve thus set brightness gradation level.

In order to prevent an erroneous opposing discharge, i.e. a discharge across the discharge space, all address electrodes A are applied with a positive potential of, for instance, +Vs/2, and at the beginning a sustain pulse Ps of positive polarity having a peak value Vs, for example 195 V, which is higher than the surface discharge firing voltage between first and second sustain electrodes X and Y in consideration of the effect of the wall charges is applied to all second sustain electrodes Y.

Subsequently, the sustain pulse Ps is applied alternately onto first sustain electrodes X and second sustain electrodes Y. Upon each application of sustain pulse Ps, the surface discharges take place in the cells that have accumulated the wall charge during address period TA.

A second preferred embodiment of the present invention is hereinafter described with reference to FIG. 7 schematically illustrating a cross-sectional cut view of a PDP 2 wherein functional elements having the same function as FIG. 5 are denoted with the same numerals.

Feature of the structure of PDP 2 is in that a line separator wall 35 is provided on border line DL of first partial screen E11 and second partial screen E12. Line separator wall 35 extends as long as the entire length of the lines of the display screen E1, and divides discharge space 30 into two along the row direction. Line separator wall 35 prevents the interference of the discharges between first partial screen E11 and second partial screen E12. Line separator wall 35 is fabricated concurrently [to] *at* the time when separator wall 29, to determine each sub-pixel shown in FIG. [6] *2,* is fabricated. Line separator wall 35 has not always to contact the inner surface of front glass substrate. That is, even if there is a gap between line separator wall 35 and the inner surface of front the front glass substrate, the interference is suppressed. This is because a surface distance between first partial address electrodes A1 and second partial address electrodes A2 is increased by the provision of line separator wall 35, that is, the electrode distance is effectively elongated.

As a modification of the above preferred embodiments, first and second partial address electrodes A1 and A2 may be arranged so as to cross over only metal film 42 of second sustain electrodes Yn & Yn+1 nearest to border line DL. In this arrangement, clearance D between first and second partial address electrodes A1 and A2 becomes further longer.

Thus, according to the present invention the interference between adjacent partial screens can be prevented.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications and equivalents may be resorted to, falling within the scope of the invention.

What is claimed is:

1. A surface-discharge type plasma display panel of a matrix display formation of lines and rows, the plasma display panel including:

a plurality of main electrode pairs formed of first and second sustain electrodes arranged on a first substrate, each extending along a line direction, the first and second sustain electrodes being in parallel and adjacent to each other;

a plurality of address electrodes arranged on a second substrate opposing the first substrate via a discharge space, each extending along a row direction, a matrix corresponding to a screen to be displayed being formed with said main electrodes and address electrodes, said address electrodes crossing over said main electrodes, each of said address electrodes being divided into at least two partial address electrodes separated from each other by a border line located between adjacent main electrode pairs, whereby said screen is divided into partial screens, a first clearance between said partial address electrodes being substantially larger than a second clearance between said main electrode pair adjacent to and across said border line, such that one of said address electrodes in said plurality of address electrodes is located on an opposite side of said partial screen, substantially distant from said second sustain electrode.

2. A *surface discharge type* plasma display panel as recited in claim 1, an arrangement of said first and second sustain electrodes is such that first sustain electrodes of said first and second partial screens face each other across said border line, and said partial address electrodes do not cross over said first sustain electrodes nearest to each other across said border line when looked in a horizontal view.

3. A *surface discharge type* plasma display panel as recited in claim 2, an arrangement order, along the row direction, of said first and second sustain electrodes is reverse each other in said first and second partial screens.

4. A *surface discharge type* plasma display panel as recited in claim 3, said address electrodes of one of said partial screens being led out to a first side of said second substrate at an end of said row, and other address electrodes of another of said partial screens being led out to a second side opposite from said first side of said second substrate.

5. A *surface discharge type* plasma display panel as recited in claim 1, wherein said first sustain electrodes are led out to a first side of said first glass substrate at an end of said line, and said second sustain electrodes are led out to a second side opposite from said first side of said first glass substrate at another end of lines.

6. A *surface discharge type* plasma display panel as recited in claim 1, further comprising a separator wall between said first and second partial address electrodes respectively of said first and second partial screens so as to effectively elongate an effective distance between said first and second partial address electrodes across said border line.

7. A surface-discharge type plasma display panel according to claim 1, wherein the first clearance across the border line between said partial address electrodes on opposite sides thereof is substantially larger than a sum of twice the width of said first sustain electrode adjacent to the border line and a second clearance across the border line between said first sustain electrode pair adjacent to the border line, and shorter than a sum of twice the width of said first sustain electrode adjacent to the border line, a second clearance across the border line between said first sustain electrode pair adjacent to the border line and twice of a third clearance between the paired first and second sustain electrodes.

8. A surface-discharge type plasma display panel according to claim 1, wherein when perpendicularly projecting the first substrate onto the second substrate, each of first ends of said partial address electrodes opposing the border line is disposed between the paired first and second sustain electrodes of said main electrode adjacent to the border line.

9. A surface-discharge type plasma display panel according to claim 1, wherein said partial screens are symmetrical to each other in relation to said sustain electrodes with respect to the border line.

10. A surface-discharge type plasma display panel according to claim 1, wherein each of said first sustain electrodes adjacent to the border line on opposite sides thereof is excluded from being crossed over by said corresponding partial address electrode.

*11. A surface-discharge type plasma display panel of a matrix display formation of lines and rows, the plasma display panel, comprising:*

*a plurality of main electrode pairs, each pair formed of first and second sustain electrodes arranged on a first substrate and extending along a line direction, the first and second sustain electrodes being in parallel and adjacent to each other; and*

*a plurality of address electrodes arranged on a second substrate opposing the first substrate via a discharge space, each extending along a row direction, a matrix corresponding to a screen to be displayed being formed with said main electrodes and said address electrodes, said address electrodes crossing over said main electrodes, each of said address electrodes being divided into at least first and second partial address electrodes separated from each other by a border line located between adjacent main electrode pairs, whereby said screen is divided into corresponding, at least first and second partial screens, a first clearance between respective ends of said at least first and second partial address electrodes being substantially larger than a second clearance between said adjacent main electrode pairs with said border line therebetween,*

*such that an end of each of said first and second partial address electrodes, adjacent the border line and of one of said first and second partial screens is located at a distance from a sustain electrode of the main electrode pair adjacent the border line of the other of said first and second partial screens so as to prevent a discharge between respective electrodes of the first and second partial screens.*

*12. A surface-discharge type plasma display panel as recited in claim 11, wherein a discharge is prevented between the partial address electrode in the one of the first and second partial screens and a sustain electrode in the other of the first and second partial screens.*

* * * * *

UNITED STATES PATENT AND TRADEMARK OFFICE

CERTIFICATE OF CORRECTION

PATENT NO. : RE 38,819 E
APPLICATION NO. : 09/951749
DATED : October 11, 2005
INVENTOR(S) : Seiki Kuroki et al.

It is certified that error appears in the above-identified patent and that said Letters Patent is hereby corrected as shown below:

Column 7, Line 49, change “pair” to --pairs--.

Signed and Sealed this

Seventh Day of November, 2006

JON W. DUDAS
*Director of the United States Patent and Trademark Office*